United States Patent
Kumar et al.

(10) Patent No.: US 12,517,844 B2
(45) Date of Patent: Jan. 6, 2026

(54) REDUCED CONTROLLER LOADING AND PERIPHERAL USAGE FOR DISPLACEMENT MEASUREMENT DEVICE EXCITATION

(71) Applicant: Hamilton Sundstrand Corporation, Charlotte, NC (US)

(72) Inventors: Manish Kumar, Bangalore (IN); Tanay Ghose, Kolkata (IN)

(73) Assignee: Hamilton Sundstrand Corporation, Charlotte, NC (US)

( * ) Notice: Subject to any disclaimer, the term of this patent is extended or adjusted under 35 U.S.C. 154(b) by 206 days.

(21) Appl. No.: 18/139,804

(22) Filed: Apr. 26, 2023

(65) Prior Publication Data

US 2023/0350818 A1     Nov. 2, 2023

(51) Int. Cl.
   *G06F 13/10*     (2006.01)
   *G06F 13/16*     (2006.01)
   *G06F 13/42*     (2006.01)

(52) U.S. Cl.
   CPC ........ *G06F 13/102* (2013.01); *G06F 13/1668* (2013.01); *G06F 13/4282* (2013.01)

(58) Field of Classification Search
   None
   See application file for complete search history.

(56) References Cited

U.S. PATENT DOCUMENTS

| | | | |
|---|---|---|---|
| 7,340,370 B2 | 3/2008 | Kawaguchi | |
| 9,562,605 B2 | 2/2017 | Shigehara | |
| 10,267,819 B2 | 4/2019 | Son et al. | |
| 2020/0232951 A1* | 7/2020 | Fetzer | G01N 29/265 |
| 2021/0064556 A1 | 3/2021 | Lassen | |

FOREIGN PATENT DOCUMENTS

CN     103176503 B     8/2017

OTHER PUBLICATIONS

Extended European Search Report issued in corresponding EP Patent Application No. 23170324.0 on Aug. 17, 2023.

* cited by examiner

*Primary Examiner* — Farley Abad
*Assistant Examiner* — Dayton Lewis-Taylor

(57) ABSTRACT

In accordance with at least one aspect of this disclosure, a system includes a main control device, including one or more of: a serial peripheral interface, a direct memory access, a central processing unit, a timing peripheral module, and/or a variable peripheral module, configured to output one or more excitation signals to a displacement measuring device, and an intermediate control module operatively connected between the main control device and the displacement measuring device configured to control communication of the one or more control signals from the main control device to the displacement measuring device based at least in part on a timing control signal from the timing peripheral module.

8 Claims, 4 Drawing Sheets

REDUCED CONTROLLER LOADING AND PERIPHERAL USAGE FOR DISPLACEMENT MEASUREMENT DEVICE EXCITATION

CROSS-REFERENCE TO RELATED APPLICATIONS

This application claims priority to and the benefit of Indian Provisional Patent Application No. 202241024734, Apr. 27, 2023, the entire content of which is incorporated herein by reference.

TECHNICAL FIELD

The present disclosure relates to excitation of controller driven devices, and more particularly to controller loading and peripheral usage for such devices.

BACKGROUND

In applications requiring excitation (e.g., sinusoidal excitation) for controller driven devices, external digital to analog converters are typically used to generate the excitation. A lookup table containing values required to construct the excitation waveforms can be preloaded in the controller's memory, where the controller is interfaced to the external digital to analog converter via a communication peripheral (e.g., a serial peripheral interface) to transfer the excitation waveform data to the digital to analog converter. Additional processes may be performed between passing the data from the digital to analog converter to the controller driven device, such as filtering, however these processes are not discussed in depth herein.

The conventional technique for data loading to the digital to analog converter, however, can have drawbacks. For example, the difference in the frequency of data transfer from the controller to the digital to analog converter relative to the frequency of excitation to be generated can be very high (e.g., typically 50 times that of the excitation frequency), which can lead to high direct memory access utilization. Because of this, the direct memory access module of a controller may even be congested to the point that it is unable to service other direct memory access requests that the application may require. Moreover, given device controllers typically only include limited number of serial peripheral interface ports (e.g., as needed for size or cost). The serial interface port in the given applications may be dedicated to preloading the waveform data to the digital to analog converter, reducing its availability for other high priority functions the system may have.

The conventional systems have been considered satisfactory, however, in order to mitigate the drawbacks of the conventional systems, there remains a need in the art for improved loading of device controllers so that certain components may be used for multiple functions, for example in aerospace applications where certain functions may need to take priority. This disclosure provides a solution for this need.

SUMMARY

In accordance with at least one aspect of this disclosure, a system includes, a main control device, including one or more of: a serial peripheral interface, a direct memory access, a central processing unit, a timing peripheral module, and/or a variable peripheral module. The main control device is configured to output one or more excitation signals to a displacement measuring device. The system also includes an intermediate control module operatively connected between the main control device and the displacement measuring device configured to control communication of the one or more control signals from the main control device to the displacement measuring device based at least in part on a timing control signal from the timing peripheral module.

A digital to analog converter can be operatively connected between the main control device and the displacement measuring device configured to receive the one or more excitation signals from the main control device and convert the one or more excitation signals to analog excitation signals to be used by the displacement measuring device.

In embodiments, the intermediate control module can include a non-volatile memory, external to the main control device. The intermediate control module can be configured to store the excitation signals as a lookup table in the non-volatile memory. The lookup table can include data configured to be used to construct analog sinusoidal wave forms used by the displacement measurement device.

In embodiments, the intermediate control module can include a first glue logic module configured to interface between the serial peripheral interface module of the main control device and the non-volatile memory to provide data loading signals to the intermediate control module. The digital to analog converter can be configured to read data from the intermediate control module without intervention from the main control device.

In embodiments, the intermediate control module can further include a second glue logic module configured to interface between the timing peripheral module of the main control device and the non-volatile memory. The second glue logic module can also be configured to interface between the main control device and the digital to analog converter. In both cases, the second glue logic module can be configured to provide timing control signals to the non-volatile memory and the digital analog converter without intervention from the main control device.

In embodiments, the system can include at least two modes of operation, including a start-up and data loading mode and an excitation generation mode. In embodiments, the central processing unit and the direct memory access can be configured to be used only during the start-up and data loading mode to send and store the excitation signals as waveform data configured to be used by the displacement measuring device in the non-volatile memory such that after the system completes the start-up and data loading mode, the serial peripheral interface module is configured for use by an external peripheral module independent from the displacement measuring device.

In embodiments, the digital to analog converter can be configured to read the waveform data stored in the non-volatile memory directly from the non-volatile memory without intervention from the central processing unit, such that after the system exits the start-up and data loading mode, the central processing unit overhead is reduced. In embodiments, the timing peripheral module can include a serial clock and sync module configured to generate a clock signal and a chip select signal, independent from the central processing unit, configured to be read directly by the non-volatile memory and the digital to analog converter, such that after the system exits the start-up and data loading mode, the central processing unit overhead is reduced.

In certain embodiments, the displacement measurement device can be or include a rotary electrical transformer configured to measure rotational displacement of a moveable component. In certain embodiments, the displacement measurement device can be or include a linear variable displacement transformer configured to measure linear displacement of a moveable component.

In accordance with at least one aspect of this disclosure, a method can include, operating a system in two operational modes, a first start-up and data loading mode and a second excitation generation mode, sequentially. The system can be the same or similar to the system described hereinabove. In certain embodiments, the system can include a micro control unit, an intermediate control module, a digital to analog converter, and a displacement measuring device.

Operating the system can include, in the first start up and data loading mode, interfacing the intermediate control module to the micro control unit via a serial peripheral interface, generating waveform data in the micro control unit and sending the sine waveform data to the intermediate control module to be stored in a lookup table via the serial peripheral interface, and disconnecting the intermediate control module from the serial peripheral interface of the micro control unit. Operating the system can also include, in the second excitation generation mode, reading the waveform data directly from the intermediate control module with the digital to analog converter, converting the sine waveform data in the lookup table from digital signals to analog voltage signals and sending the analog voltage signals to the displacement measuring device as excitation voltage, and operating one or more external peripheral interfaces via the serial peripheral interface of the micro control unit in parallel with reading and converting.

In embodiments, in the first start-up and data loading mode, the method can further include setting a general purpose input/output of the micro control unit to a first logic state, interfacing a non-volatile memory of the intermediate control module to the micro control unit via the serial peripheral interface using one or more switches of the intermediate control module, transferring lookup table data to the non-volatile memory, setting one or more timing switches of the intermediate control module a in a high impedance mode so as not interfere with the established micro control unit and intermediate control module interface, and preventing communication between the digital to analog converter and the micro control unit.

In embodiments, in the second excitation generation mode, the method can further include setting the general purpose input/output of the main control device to a second logic state and interfacing the one or more timing switches to the non-volatile memory of the intermediate control module, to the main control device, and the digital to analog converter. The method can include, in the second excitation generation mode, generating, with a first glue logic of the intermediate control module, a pulse sequence of one or more predetermined frequencies to emulate a chip select signal as if it were generated by the micro control unit for use by the non-volatile memory of the intermediate control module as chip select data and generating, with a second glue logic of the intermediate control module, a pulse sequence of one or more predetermined frequencies to emulate a clock signal as if it were generated by the micro control unit for use by the non-volatile memory of the intermediate control module as clock data.

In embodiments, in the second excitation generation mode, the method can further include using the intermediate control module as a serial communication line to write opcode to read data out from the non-volatile memory to take the place of the serial peripheral interface and cycling the non-volatile memory through the preloaded lookup table data, sending the lookup table data to the digital to analog converter and converting the lookup table data to equivalent analog voltage.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
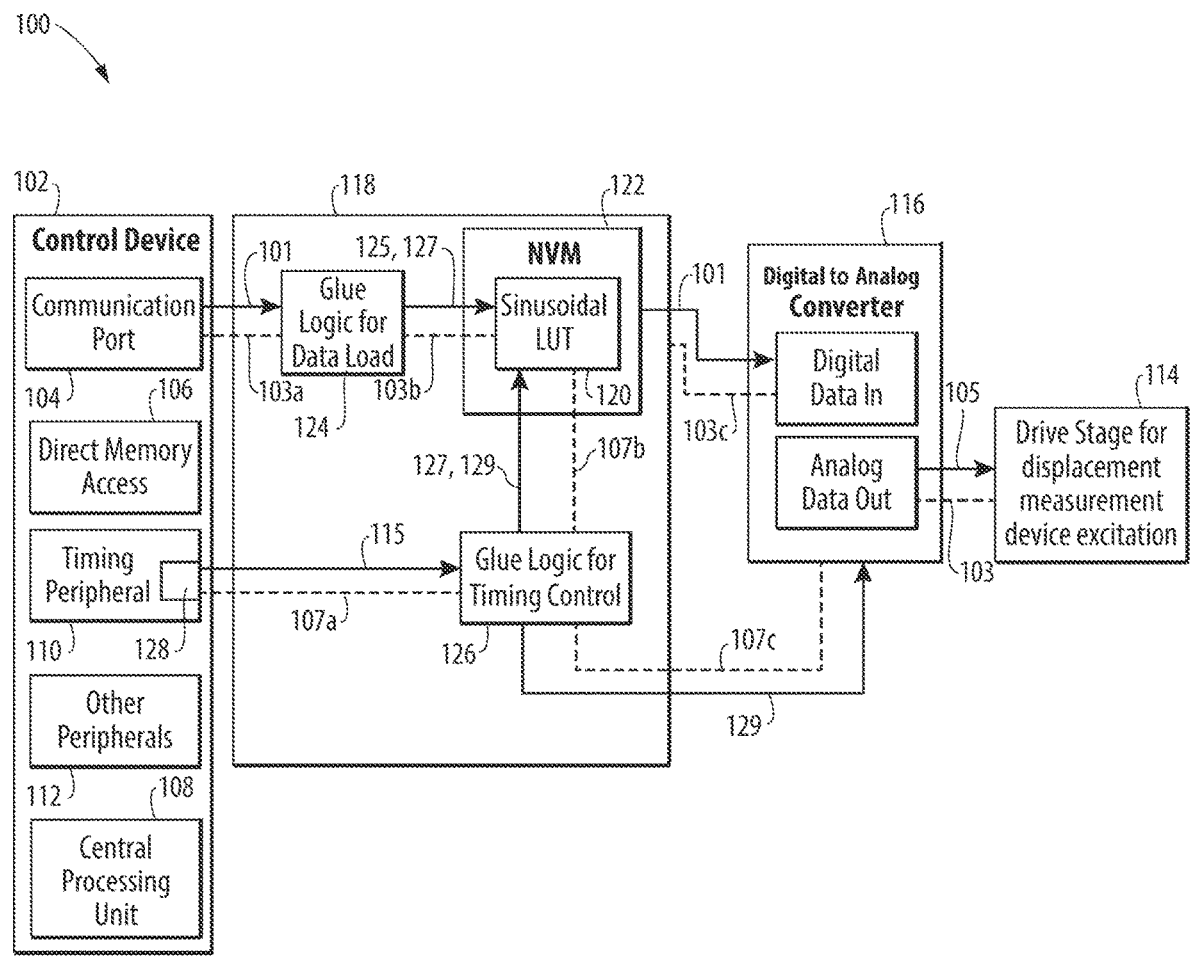
FIG. 1 is a schematic diagram of a system in accordance with this disclosure, showing a control scheme for a displacement measurement device.

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100.

Other embodiments and/or aspects of this disclosure are shown in FIGS. 2-5. Certain embodiments described herein can be used to improve functionality and multi-tasking of a micro control unit.

In accordance with at least one aspect of this disclosure, as shown in FIG. 1, a system 100 includes a main control device 102 (e.g., a micro control unit ("MCU")) having one or more of: a serial peripheral interface 104 (and associated port), a direct memory access 106, a central processing unit 108, a timing peripheral module 110, and/or a variable peripheral module 112 (e.g., which can be changed for a given application). The main control device 102 can be configured, through its various modules, to output one or more excitation signals 101 over a first data line 103 to a displacement measuring device 114.

In embodiments, the displacement measurement device 114 can include a rotary electrical transformer configured to measure rotational displacement of a moveable component (not shown) and/or a linear variable displacement transformer configured to measure linear displacement of a moveable component. Such displacement measurement devices 114 can operate by associating a specific signal value for any given position of the device 114. This association of a signal value to a position can occur through electromagnetic coupling of an excitation signal on a primary winding of the device 114 to a core of the device 114 and back to a secondary winding of the device 114. In order to send the excitation signal to the device 114, a signal must first be generated via a control device, such as the main control device 102.

Typically, the main control device 102 generates this signal and continuously sends such signals, or data needed to generate the signals, to a digital to analog converter 116, before the signal can be sent to and used by the displacement measurement device 114. However, this can significantly increase the overhead of the central processing unit 110, and can congest the serial peripheral interface 104 of the main control device 102 if it is constantly occupied generating and sending excitation signals to the displacement measurement device 114.

As shown, an intermediate control module 118 can be operatively connected between the main control device 102 and the displacement measuring device 114 configured to control communication of the one or more control signals from the main control device 102 to the displacement measuring device 114 based at least in part on a timing control signal 115 from the timing peripheral module 110. In doing so, as described further below, the serial peripheral interface 104 may then be replaced with the intermediate control module 118 for signal generation, once an initial data transfer is complete. Then, after start up, the serial peripheral interface 104 is available for other, higher priority operations, while the intermediate control module 118 continues to cycle and generate the excitation signals 101 and send the signals 101 to the displacement measuring device 114.

The digital to analog converter 116 is operatively connected between the main control device 102 and the displacement measuring device 114. More specifically, as shown in FIG. 1, the digital to analog converter 116 is connected between the intermediate control module 118 and the displacement measurement device 114 and can be configured to receive the one or more excitation signals 101 from the main control device 102 (through the intermediate control module 118) and convert the one or more excitation signals 101 to analog control signals 105 (e.g., analog sine waves) to be used by the displacement measuring device 114. The intermediate control module 118 can include, or be configured to generate based on the signals from the main control device, a lookup table 120 to store the data (e.g., quantized sinusoidal waveform data) to configured to be used to construct analog sinusoidal wave forms 105 used by the displacement measurement device 114.

The intermediate control module 118 can include a non-volatile memory 122 external to the main control device 102, where the lookup table 120 is stored in the non-volatile memory 122. The intermediate control module 118 can also include a first glue logic module 124 configured to interface between the serial peripheral interface 104 of the main control device 102 at a first portion 103*a* of the data line 103 and the non-volatile memory 120 at a second portion 103*b* of the data line 103 to provide data loading signals 125 to the intermediate control device 118 via the second portion 103*b* of the first data line. In doing so, the digital to analog converter 116 is able to read data directly from the intermediate control module 118 (e.g., the non-volatile memory 122) over a third data line portion 103*c*, without intervention from the main control device 102. More specifically, at start up, the main control device 102 is configured to provide the initial data load (e.g., signals 101 and 125) to the intermediate control module 118 to be stored in the non-volatile memory 122, then provide a disconnect at the first portion of the data line 103*a* from the main control device 102 (e.g., from both the serial peripheral interface and the central processing unit of the main control device). Once disconnected, the timing peripheral module 110 of the main control device 102 can be still be used to generate control signals for data transfer between the non-volatile memory 122 and the digital to analog converter 116, for example to allow the intermediate control module 118 to provide the data and excitation signals 101 to the measurement device 114 without connection to the main control device 102 via the serial peripheral interface 104, as discussed further below.

The intermediate control module 118 can also include a second glue logic module 126 configured to interface at a first portion 107*a* of a second data line 107 between the timing peripheral module 110 of the main control device 102 and the non-volatile memory 122 (e.g., at a second data line portion 107*b*) to provide chip select signals 127 to the non-volatile memory 122 and to interface between the main control device 102 and the digital to analog converter 116 (e.g., over a second data line portion 107*c*) to provide timing control signals 129 to the non-volatile memory 122 and the digital analog converter 116 without intervention from the main control device 102. Here, the second glue logic module 126 allows the timing peripheral module 110 to operate as an independent timing block 128 so that upon disconnection from the main control device 102 at 103*a*, the intermediate control module 118 and the digital to analog converter 116 are provided with dedicated timing control via data line 107. The specific operation of the glue logic modules 124, 126 will be described further herein below with respect to FIGS. 3-4.

The system 100 can have at least two modes of operation, including a first mode, a start-up and data loading mode 250 (e.g., as described with reference to FIG. 3) and a second mode, an excitation generation mode 350 (e.g., as described with reference to FIG. 4). The system 100 is configured, as described above, so that the central processing unit 110, the direct memory access 106, and the serial peripheral interface 104 are configured to be used only during the start-up and data loading mode 250. During the first mode 250, at least central processing unit 110, the direct memory access 106, and the serial peripheral interface 104 are configured to send and store the waveform data configured to be used by the displacement measuring device 114 in the non-volatile memory 122. After the system 100 completes the start-up and data loading mode 250, the serial peripheral interface 104 is configured for use with any other interface, independent from the displacement measuring device 114, but in parallel with the displacement measuring device 114. The additional interfaces can include an external interface, for example an interface that is not a peripheral on the main control device 102 chip itself. The external interface may be additional sensors, additional signal processors (e.g., digital to analog converters or analog to digital converters), additional memories, or the like, but that are not linked to the displacement measurement scheme of the present application. This is because the displacement measurement device 114 and digital to analog converter 116 are connected to the intermediate control module 118 only via data line 107*a* after start up, without connection to the serial peripheral interface 104 or the central processing unit 108 of the main control device 102.

The digital to analog converter 116 can be configured to read the waveform data stored in the non-volatile memory 122 directly from the non-volatile memory 122 without intervention from the central processing unit 108. In doing so, after the system 100 exits the start-up and data loading mode 250, the central processing unit 108 and direct memory access 106 also experience reduced overhead because the digital to analog converter 116 is connected directly to the intermediate control module 118 via lines 103*c*, 107*c*.

The timing peripheral module 110 can include a serial clock and sync module 128 configured to generate a chip select signal 127 and a clock signal 129, independent from the central processing unit 108. The clock signals 129 and chip select signals 127 are configured to be read directly by the non-volatile memory 122 and the digital to analog converter 116 via lines 107b, 107c. Similarly here, the central processing unit 108 and direct memory access 106 experience reduced overhead because the timing peripheral module 110 acts as a dedicated time block separate from the main control device 102, where the timing peripheral module 110 generates signals to emulate those that would have been provided by the main control device 102. Accordingly, this allows the digital to analog converter 116 to be connected directly to the intermediate control module 118, without connection to a main clock of the main control device 102.

Figure 2:
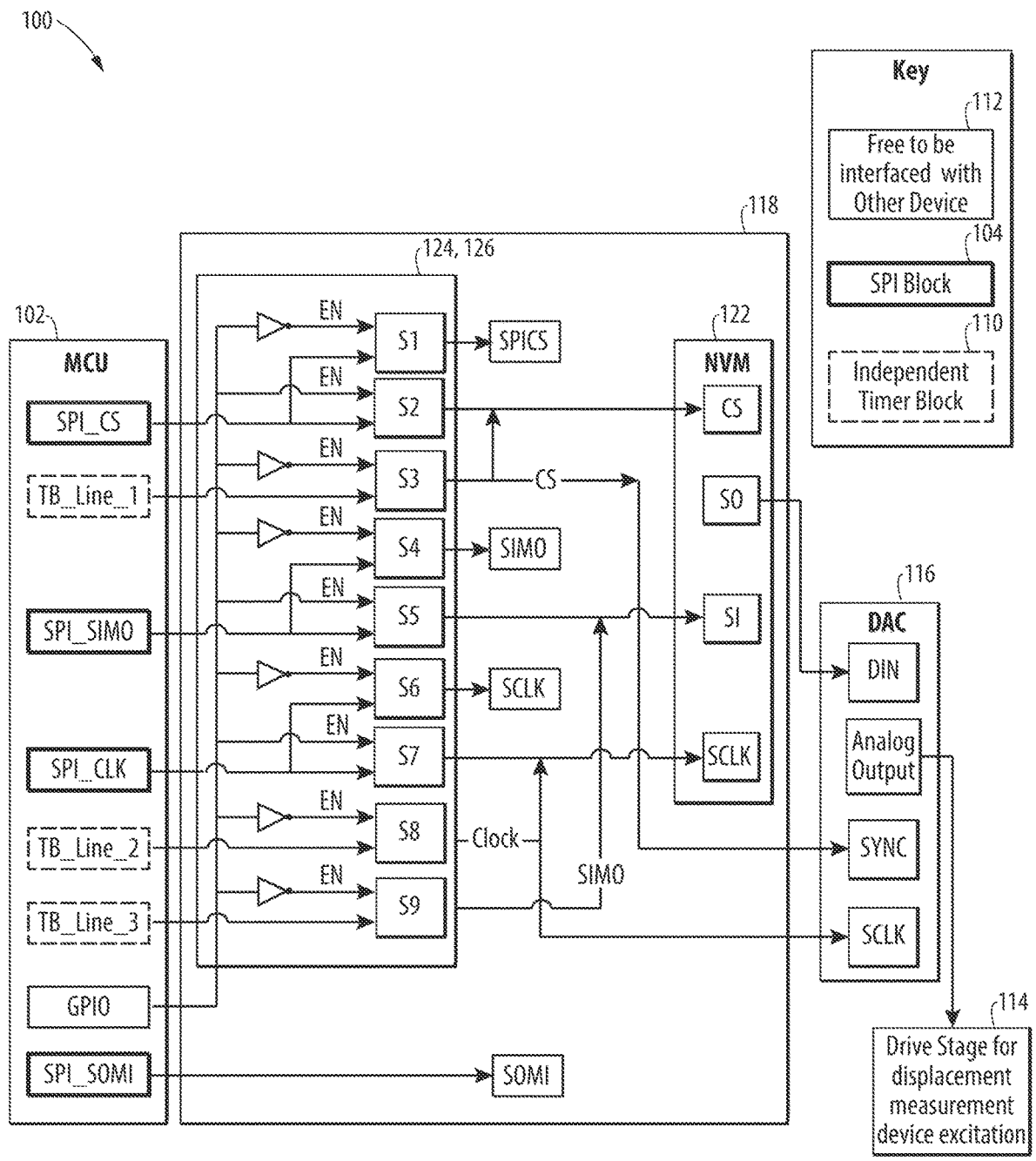
FIG. 2 is a detailed schematic diagram of the system of FIG. 1, showing a switching scheme of the system.
Figure 3:
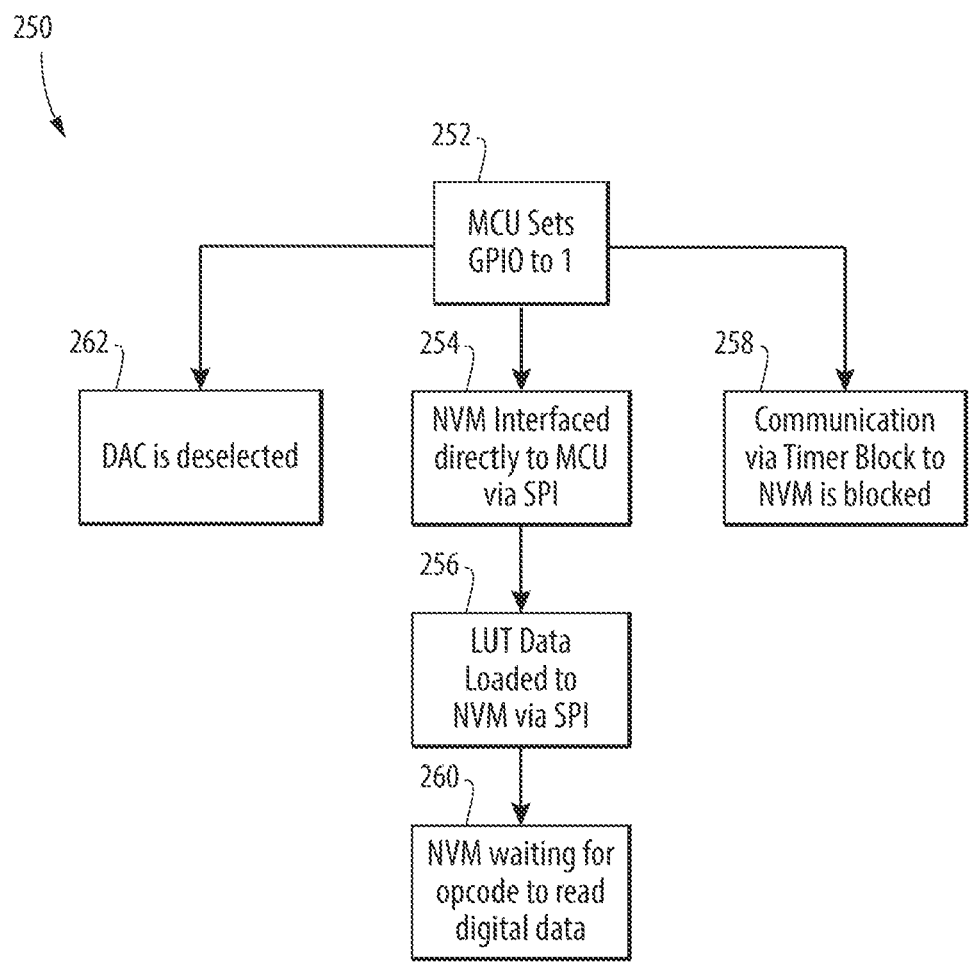
FIG. 3 is a flow chart of a first operational mode of the system.
Figure 4:
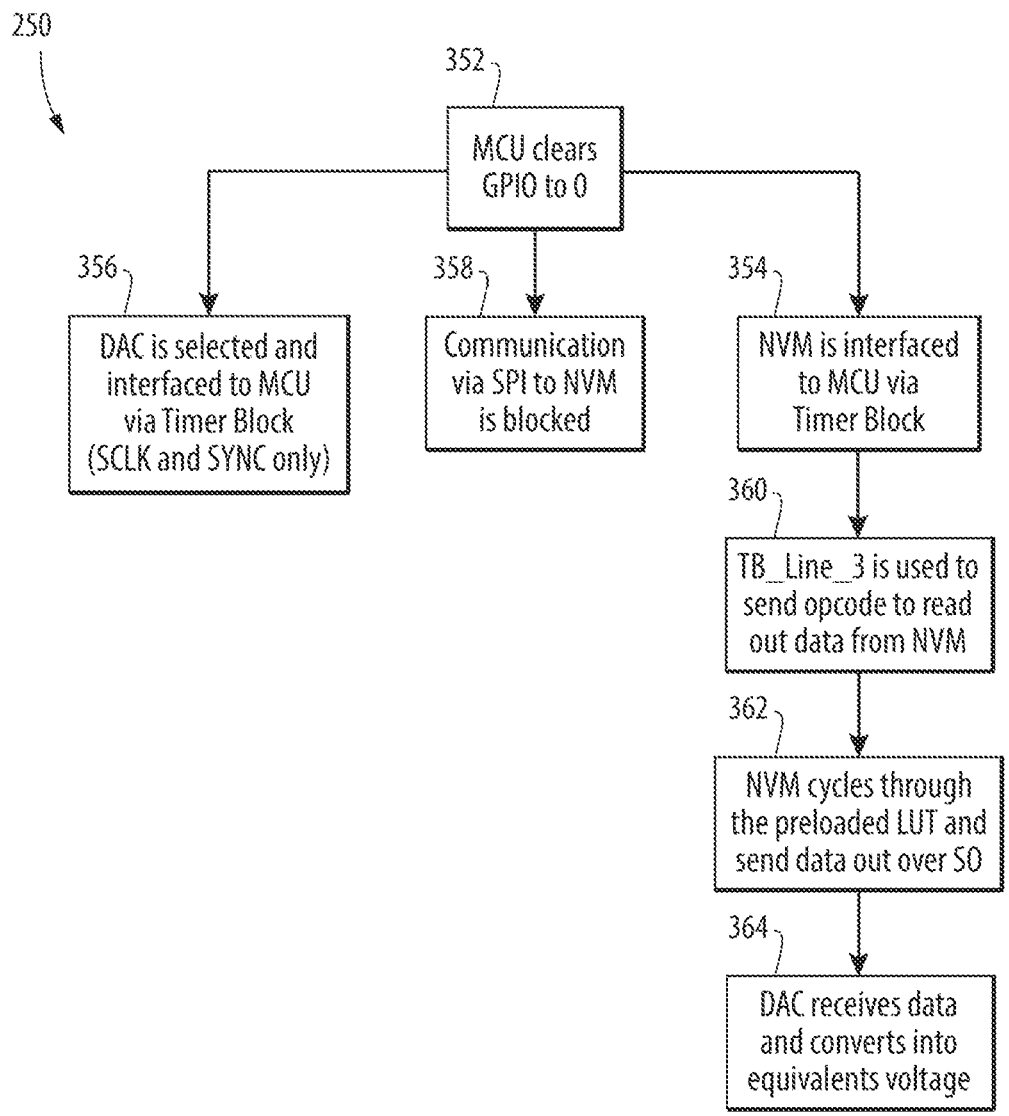
FIG. 4 is a flow chart of a second operational mode of the system.

Referring now to FIGS. 2-4, in accordance with at least one aspect of this disclosure, a method can include, operating a system (e.g., system 100) in two operational modes, a first start-up and data loading mode (e.g., mode 250) and s second excitation generation mode (e.g., mode 350), sequentially. The system can be the same or similar to system 100, and can include a micro control unit (e.g., main control device 102), an intermediate control module (e.g., module 118), a digital to analog converter (e.g., converter 116), and a displacement measuring device (e.g., device 114). In embodiments, the method can be a method performed by the system 100, or the method may be stored as instructions in a memory or a non-transitory computer readable medium, wherein a computer is configured to perform the method given the computer readable instructions.

In the first start up and data loading mode 250, the method can further include, interfacing the intermediate control module 118 to the micro control unit 102 via a serial peripheral interface 104, generating sine waveform data in the micro control unit 102 and sending the sine waveform data to the intermediate control module 118 to be stored in a lookup table 120 via the serial peripheral interface 104, and disconnecting the intermediate control module 118 from the serial peripheral interface 104 of the micro control unit 102.

Additionally, in the first start-up and data loading mode 250, the method includes, setting a general purpose input/output GIPO of the micro control unit 102 to a first logic state (e.g., a 1), interfacing the non-volatile memory 122 of the intermediate control module 118 to the micro control unit 102 via the serial peripheral interface 104 using one or more switches S1-S9 of the intermediate control module 118, transferring lookup table data to the non-volatile memory 122, setting one or more timing switches S1-S9 of the intermediate control module 118 in a high impedance mode so as not interfere with the established micro control unit 102 and intermediate control module 118 interface, and preventing connection between the digital to analog converter 116 to the micro control unit 102. As used herein, the term "switch" used to represent any device logic which allows a signal to pass, if the device is enabled by a control signal. For example, this functionality maybe implemented by an AND Gate, a 1:1 MUX, a Single Pole Dual Throw Switch, and/or the like, however any suitable "switch" is contemplated herein and this disclosure does not limit the choice of such "switch" device to those explicitly recited herein.

In the second excitation generation mode 350, the method can include, reading the sine waveform data directly from the intermediate control module 118 with the digital to analog converter 116, converting the sine waveform data in the lookup table from digital signals to analog voltage signals and sending the analog voltage signals to the displacement measuring device 114 as excitation voltage, and operating additional peripheral modules 112 via the serial peripheral interface 104 of the micro control unit in parallel with the digital to analog converter 116 while it is converting.

Additionally, in the second excitation generation mode 350, the method can include, setting the general purpose input/output GPIO of the main control device 102 to a second logic state (e.g., a 0), interfacing the one or more timing switches S1-S9 to the non-volatile memory 122 of the intermediate control module 118 to the main control device 102 and the digital to analog converter 116. The method includes emulating, with a first glue logic 124 of the intermediate control module 118 and the timer block 128, a chip select signal 127 having a a pulse sequence of one or more predetermined frequencies, as if it were generated by the micro control unit 102 by its own serial peripheral interface 104 based communication. The emulated chip select signal 127 can then be received and used by the non-volatile memory 122 of the intermediate control module 118 as chip select data. Further, the method includes emulating, with a second glue logic 126 of the intermediate control module 118 and the timer block 128, a clocking signal 129 having a pulse sequence of one or more predetermined frequencies as if it were generated by the micro control unit 102 by its own serial peripheral interface 104 based communication. The emulated clocking signal 129 can then be received and used by the non-volatile memory 122 of the intermediate control module 118 as clock data.

The method further includes using the intermediate control module 118 as a serial communication line to write the opcode to read data out from the non-volatile memory 122 to take the place of the serial peripheral interface 104 and disconnecting the intermediate control module 118 from the serial peripheral interface 104 of the micro control unit 102. The method includes cycling the non-volatile memory 122 through the preloaded lookup table data, sending the lookup table data to the digital to analog converter 116, converting the lookup table data equivalent analog voltage, and sending the analog voltage as sinusoidal voltage waveform to the displacement measurement device 114.

In traditional systems, the lookup table (e.g., having sinusoidal waveform data) is stored in the main control device's internal memory itself and each data point in the lookup table is sent over the serial peripheral interface directly to the digital to analog converter. However, as described herein, the disclosed system 100 provides a novel solution to congestion caused in the traditional systems because the system 100 includes the lookup table 120 stored in the main control device's 102 internal memory only on startup, but then transfers the lookup table 120 to the non-volatile memory 122 of the intermediate control module 118 after startup, so that the serial peripheral interface 104 is free for other uses, such as more high priority uses.

Then, to generate the excitation needed for the displacement measurement device 114, the timing peripheral module 110 (which can be internal to the main control device or can be part of the intermediate control module 118) independently provides the necessary control signals (data in, data out, chip select, clock, etc.) to transfer the data from the non-volatile memory 122 in the intermediate control module 118 to the digital to analog converter 116. The digital to analog converter 116 is then able to convert each data point received from the non-volatile memory 122 to its equivalent analog voltage and passes the signal onto the subsequent drive stages for any number of connected displacement measurement devices 114.

Those skilled in the art having had the benefit of this disclosure will readily appreciate how to connect the digital to analog converter 116 to the displacement measurement device 114 by adapting from traditional system, however in certain embodiments, the output of the digital to analog converter 116 may also amplify and condition the signal 105 before providing it to the displacement measurement device 114.

Because the lookup table 120 is stored external to the main control device 102, once the start-up and data loading mode 250 is complete, the main control device 102 need not intervene to load the lookup table data to the digital to analog converter 116. Additionally, in embodiments, the main control device 102 can include the timing peripheral module 110 that is dedicated for controlling the timing of the memory 122 of the intermediate control module 118 and the digital to analog converter 116, thus, the central processing unit 108 and direct memory access 106 of the main control device 102 need to only be used during the startup and data loading mode 250 to perform the initial data loading/transfer of the lookup table 120 to the non-volatile memory 122 of the intermediate control module 118.

More specifically regarding the timing peripheral module, it can be configured to have a standalone control unit (e.g., timer block 128) within the main control device 102, which can be used without intervention from the main central processing unit 108 of the main control device 102. For example, the timing peripheral module 110 can include (but is not limited to) an Enhanced High End Timer peripheral. The included timing peripheral module may require a setup only during the main control device 102 boot-up sequence, after which the timing peripheral module 110 can then perform other tasks (e.g., toggling lines at specified frequencies) independently.

Still with reference to FIG. 2, which shows a more detailed illustration of the system 100 shown schematically in FIG. 1, FIG. 2 includes the lookup table approach to store the predetermined values needed to construct the sinusoidal waveforms. Storing and accessing the data in the lookup table 120 from the non-volatile memory 122 of the intermediate control module 118, rather than the main control device 102 itself, eliminates the need to use the direct memory access 106, thereby freeing up the direct memory access 106 for data transfer to other peripherals. As described, the memory 122 in the intermediate control module 118 need only be loaded with the lookup table 120 once, during application software startup. After loading the lookup table to the non-volatile memory, the main control device's serial peripheral interface may then be freed up for other high priority functions the system may have.

The external digital to analog converter 116 can then directly read the lookup table data stored in the non-volatile memory 122. The excitation signals 101 and timing signals 129 provided to the non-volatile memory 122 via data lines 103a, 103b, 107a, and 107b at startup allow the digital to analog converter 116 to bypass the serial peripheral interface 104, and to operate only via connection over data lines 103c and 107c with no intervention from the central processing unit 108, thereby reducing central processing unit 108 overhead during operation. The digital to analog converter 116 thus is able to read the lookup table data over 103c, which can be seen as reading effectively from the main control device 102, e.g., as if it were being transmitted via the serial peripheral interface 104, but without any actual connection thereto. Even though the non-volatile memory 122 acts as the master for the digital to analog converter 116, as it stores the required data, both the devices (e.g., the non-volatile memory 122 and the digital to analog converter 116) are be configured as slaves, with serial clock and sync or chip select signals generated by the main control device. Additionally, despite the source of these signals and the data source being conventionally the same, it is technically not required to be so. To take advantage of this, the serial clock and sync or chip select signals which are required for serial peripheral interface communication can be generated using the timer block 128 of the independent timing peripheral module 110. As described, the timer block 128 has to be configured only once at startup, so the serial clock and sync or chip select signals can be also be generated with no central processing unit 108 overhead.

As shown in FIG. 2, the main control device 102 ("MCU") can include the following:
at least one serial peripheral interface port ("SPI Port"), with the following functionality:
SPI_CS—Chip Select for SPI Port;
SPI_SIMO—Slave In Master Out Data pins for SPI Port;
SPI_SOMI—Slave Out Master In Data pins for SPI Port; and
SPI_CLK—SPI Clock;
at least three timer block (TB_Line_#) pins; and
at least one GPIO.

The non-volatile memory 122 ("NVM") can be configured as slave and interfaced over the serial peripheral interface, with the following functionality:
SI—Serial Data Input pin; to be connected to SIMO of MCU;
SO—Serial Data Output pin; to be connected to DI of DAC;
CS—SPI Chip Select pin; and
SCLK—Serial Clock; required to synchronize the data being transmitted The digital to analog converter 116 ("DAC") can be configured as slave and interfaced over the serial peripheral interface, with the following functionality:
DIN—Serial Data In pin; to be connected to SO of NVM;
SCLK—Serial Clock; required to synchronize the data being transmitted;
SYNC—SPI Chip Select pin; and
O/P Analog Voltage Pins.

Referring now to FIG. 3, the specific implementation of the start-up mode 250 will be discussed using the truth tables for the switches S1-S9 of the glue logic modules 124, 126, in conjunction with the diagram shown in FIG. 2. In the startup and data loading mode 250, the switching truth table is shown in Truth Table 1.

At software startup, at block 252 MCU_GPIO is set to Logic 1, enabling the output of switches S2, S5 and S7 to connect SPI_CS, SPI_SIMO and SPI_CLK to appropriate I/Os of the non-volatile memory 122. With the main control unit 102 interfaced to the non-volatile memory 122 over serial peripheral interface 104 (e.g., block 254), the main control device 102 then transfers the lookup table 120 to the non-volatile memory 122 at block 256. Additionally, having MCU_GPIO at Logic 1 keeps the output of switches S1, S3, S4, S6 and S9 in high impedance mode, so that they do not interfere with the MCU-NVM interface that has already been established (e.g., block 258). During this time, at block 260, the non-volatile memory 122 waits for opcode, and as shown at block 262, the digital to analog converter 116 is kept deselected preventing it from receiving any unwanted signal from the main control device 102.

Referring now to FIG. 4, the specific implementation of the excitation generation mode 350 will be discussed using the truth tables for the switches S1-S9 of the glue logic modules 124, 126, in conjunction with the diagram shown in FIG. 2. In the excitation generation mode 350, the switching truth table is shown in Truth Table 2.

After completion of startup and data loading mode 250, at block 352 the MCU_GPIO is set to Logic 0, enabling the output of switches S1, S3, S4, S6, S8 and S9 to connect TB_Line_1, TB_Line_2, TB_Line_3 to appropriate I/Os of the non-volatile memory 122 and digital to analog converter 116. Having MCU_GPIO at Logic 0, keeps the output of switches S2, S5 and S7 in high impedance mode. Now, at block 354 and block 356 the data lines for the non-volatile memory 122 and the digital to analog converter 116 are effectively interfaced via the serial peripheral interface 104, with the timing control 110 provided by the main control device 102. Here, the term "effectively" means the data lines are connected to the digital to analog converter 116 such that any signal transmitted therethrough appears to the digital to analog converter 116 as though it has come from the serial peripheral interface 104, though in actuality, the data is transferred only from the non-volatile memory 122, without connection to the serial peripheral interface 104.

Because the serial peripheral interface 104 is not being used in generating the excitation generation mode 350, the main control device's serial peripheral interface port is now free to be interfaced and used with another peripheral, as shown in block 358.

Additionally, the timer block behaves as a standalone device and requires no central processing unit intervention once it has been programmed and the logic to control TB_Line_1, TB_Line_2, and TB_Line_3 is preloaded before this step (e.g., in the startup and data loading mode). In operation in the second mode, to generate the excitation signals, TB_Line_1 generates a square wave of predetermined frequency to emulate SPI chip select signal 127 for the slaves (non-volatile memory and digital to analog converter). The nature of the chip select signal 127 is the same as if it were generated by the SPI_CS pin of the main control device. TB_Line_2 generates a square wave of predetermined frequency to emulate the SPI clock signal 129 for the slaves (non-volatile memory and digital to analog converter), and similarly, the nature of the clock signal 129 is the same as if it were generated by the SPI_CLK pin of the main control device. In both cases, the timer block 128 does not actually require intervention or assistance in signal generation from the main control device 102. In operation, it is important that the slaves to receive the same clock and chip select signals 129, 127.

At block 360, TB_Line_3 can then be used as a serial communication line to write the opcode to read data out from the non-volatile memory 122. The serial peripheral interface 104 is not required for this writing during the setup stage because once the opcode is written, data will be read out and on switching from the serial peripheral interface 104 to the timer block 128. Upon receiving the clock and chip select signals, at block 362, the non-volatile memory 122 then cycles through the preloaded lookup table 120 and sends the data points to the digital to analog converter 116 via the SO pin connected to the DIN pin. After receiving a data point, at block 364, the digital to analog converter 116 converts the digital data to its equivalent analog voltage and the sinusoidal voltage waveform is then sent to the drive stage for operation of the displacement measurement device 114.

Embodiments allow for reduction of direct memory access utilization for generation of excitation (to zero or near zero) and can avoid or prevent direct memory access congestion and challenges associated therewith. In doing so, the direct memory access may then be used for other high priority functions that the system may be required to perform in parallel with the generation of excitation, and without requiring a larger or more complex main control device.

Embodiments can reduce software overhead during the generation of excitation because the main central processing unit is required only for setup of the timer block and to load the sinusoidal lookup table to the non-volatile memory. Once the initial setup and data loading is complete, there is no involvement of the main central processing unit in excitation generation or operation of the displacement measurement device. Embodiments also free up a serial peripheral interface port (after initial configuration) to be used by other high priority functions, which can be critical for applications using main control devices with limited number of communication peripherals. Embodiments allow for future scalability of the system, even if the main control device does include a limited number of peripherals and ports, without requiring a larger main control device to be used. Larger and more complex main control devices may not be desirable in certain application due to size, weight, or cost, for example, so the systems and methods described herein provide an alternative to upgrading the hardware where it may not be feasible.

As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," "device," or "system." A "circuit," "module," or "system" can include one or more portions of one or more separate physical hardware and/or software components that can together perform the disclosed function of the "circuit," "module," "device," or "system", or a "circuit," "module," "device," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

TRUTH TABLE 1

| MCU_GPIO | S1 O/P | S2 O/P | S3 O/P | S4 O/P | S5 O/P | S6 O/P | S7 O/P | S8 O/P | S9 O/P |
|---|---|---|---|---|---|---|---|---|---|
| 1 | Hi-Z | SPI_CS | Hi-Z | Hi-Z | SPI_SIMO | Hi-Z | SPI_CLK | Hi-Z | Hi-Z |
| | NVM | | | | DAC | | | | |
| | SI | SO | CS | SCLK | DIN | SCLK | SYCN | CH_A | |
| | SPI_SIMO | X | SPI_CS | SPI_CLK | X | X | 0 | X | |

TRUTH TABLE 2

| MCU_GPIO | S1 O/P | S2 O/P | S3 O/P | S4 O/P | S5 O/P | S6 O/P | S7 O/P | S8 O/P | S9 O/P |
|---|---|---|---|---|---|---|---|---|---|
| 0 | SPI_CS | Hi-Z | TB_Line_1 | SPI_SIMO | Hi-Z | SPI_CLK | Hi-Z | TB_Line_2 | TB_Line_3 |
| | NVM | | | | DAC | | | | |
| | SI | SO | CS | SCLK | DIN | SCLK | SYCN | CH_A | |
| | 0 | DIN | TB_Line_1 | TB_Line_2 | SO | TB_Line_2 | TB_Line_1 | LUT Data Analog O/P | |

What is claimed is:

1. A method, comprising:
operating a system in two operational modes, a first start-up and data loading mode and a second excitation generation mode, sequentially, wherein the system includes a micro control unit, an intermediate control module, a digital to analog converter, and a displacement measuring device, wherein operating the system includes:
in the first start up and data loading mode:
interfacing the intermediate control module to the micro control unit via a serial peripheral interface;
generating waveform data in the micro control unit and sending the waveform data to the intermediate control module to be stored in a lookup table via the serial peripheral interface; and
disconnecting the intermediate control module from the serial peripheral interface; and
in the second excitation generation mode;
reading the waveform data directly from the intermediate control module with the digital to analog converter;
converting the waveform data in the lookup table from digital signals to analog voltage signals and sending the analog voltage signals to the displacement measuring device as excitation voltage; and
operating one or more external peripheral interfaces via the serial peripheral interface in parallel with reading and converting.

2. The method of claim 1, wherein, in the first start-up and data loading mode, the method further includes:
setting a general purpose input/output of the micro control unit to a first logic state;
interfacing a non-volatile memory of the intermediate control module to the micro control unit via the serial peripheral interface using one or more switches of the intermediate control module;
transferring lookup table data to the non-volatile memory;
setting one or more timing switches of the intermediate control module in a high impedance mode so as to not interfere with the established micro control unit and intermediate control module interface; and
preventing communication between the digital to analog converter and the micro control unit.

3. The method of claim 2, wherein, in the second excitation generation mode, the method further includes:
setting the general purpose input/output of the main control device to a second logic state;
interfacing the one or more timing switches to the non-volatile memory of the intermediate control module, the main control device, and the digital to analog converter;
generating, with a first glue logic of the intermediate control module, a pulse sequence of one or more predetermined frequencies to emulate a chip select signal as if it were generated by the micro control unit for use by the non-volatile memory of the intermediate control module as chip select data;
generating, with a second glue logic of the intermediate control module, a pulse sequence of one or more predetermined frequencies to emulate a clock signal as if it were generated by the micro control unit for use by the non-volatile memory of the intermediate control module as clock data;
using the intermediate control module as a serial communication line to write opcode to read data out from the non-volatile memory to take the place of the serial peripheral interface; and
cycling the non-volatile memory through the lookup table data, sending the lookup table data to the digital to analog converter and converting the lookup table data to an equivalent analog voltage.

4. The method of claim 2, wherein the non-volatile memory is external to the micro control unit.

5. The method of claim 1, wherein the displacement measuring device includes a rotary electrical transformer configured to measure rotational displacement of a moveable component.

6. The method of claim 1, wherein the displacement measuring device includes a linear variable displacement transformer configured to measure linear displacement of a moveable component.

7. The method of claim 1, wherein the digital to analog converter reads the waveform data directly from a non-volatile memory of the intermediate control module without intervention from the micro control unit such that, after the system exits the first start up and data loading mode, the micro control unit's overhead is reduced.

8. The method of claim 1, wherein a clock signal and a chip select signal are generated independent from the micro control unit such that, after the system exits the first start up and data loading mode, the micro control unit's overhead is reduced.

* * * * *